United States Patent [19]
Norrish

[11] 3,814,460
[45] June 4, 1974

[54] LOAD SECURING APPARATUS FOR PICKUP TRUCKS
[76] Inventor: John H Norrish, 817 Crace St., Nanaimo, British Columbia, Canada
[22] Filed: Jan. 15, 1973
[21] Appl. No.: 323,999

[30] Foreign Application Priority Data
Dec. 15, 1972  Canada.............................. 159151

[52] U.S. Cl...................... 280/179 R, 296/23 MC
[51] Int. Cl............................................. B60p 3/32
[58] Field of Search................... 280/179 R, 179 A; 296/23 MC

[56] References Cited
UNITED STATES PATENTS
3,698,758  10/1972  Dodgen........................ 296/23 MC
3,706,469  12/1972  Covert........................ 296/23 MC Primary Examiner—Robert R. Song
Attorney, Agent, or Firm—Fetherstonhaugh & Co.

[57] ABSTRACT

Apparatus for securing a camper directly to a frame of a truck and including a crossbar which extends beneath the longitudinal frame members of the truck. Spacer blocks are placed between the crossbar and the frame members in one of three alternative positions of use according to the space available beneath the truck. The blocks and crossbar are secured to the frame member by clamping means having two alternative positions of use. Strpping means which are adjustable as to length attach the outer end of the crossbar to the sides of the camper.

5 Claims, 7 Drawing Figures

PATENTED JUN 4 1974 3,814,460
SHEET 1 OF 2
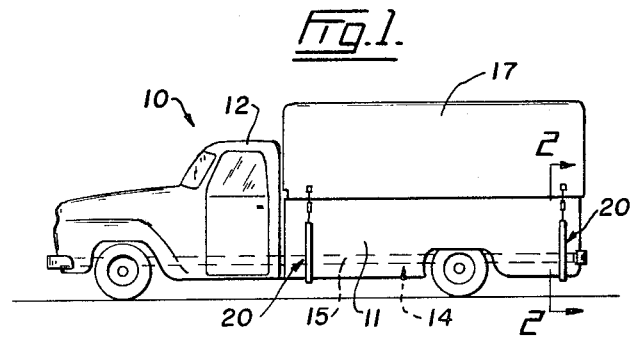
Fig. 1.
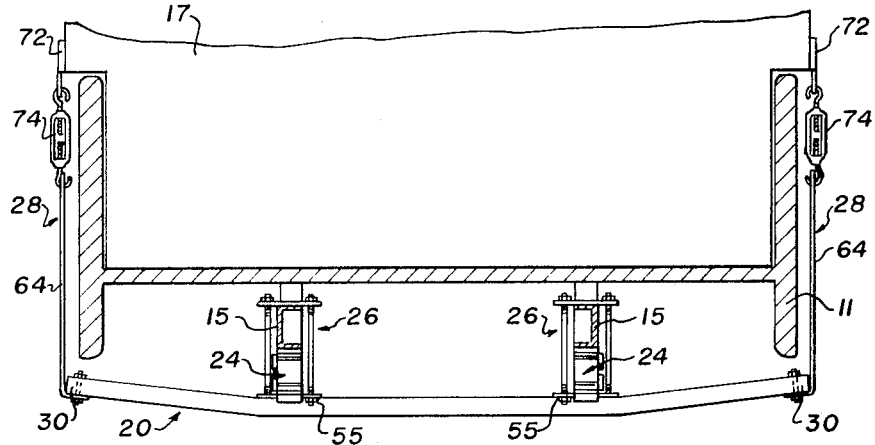
Fig. 2.
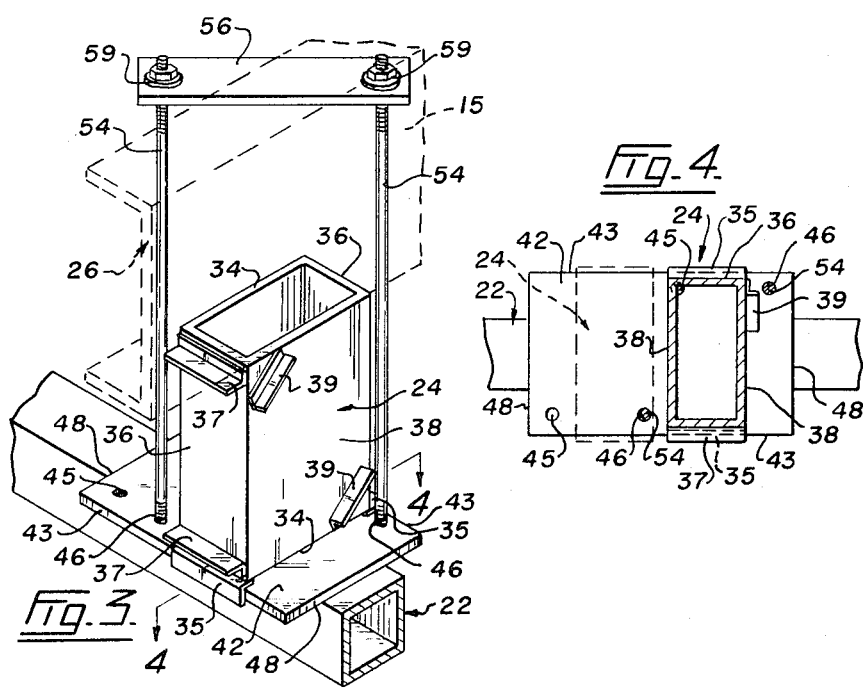
Fig. 3.
Fig. 4.

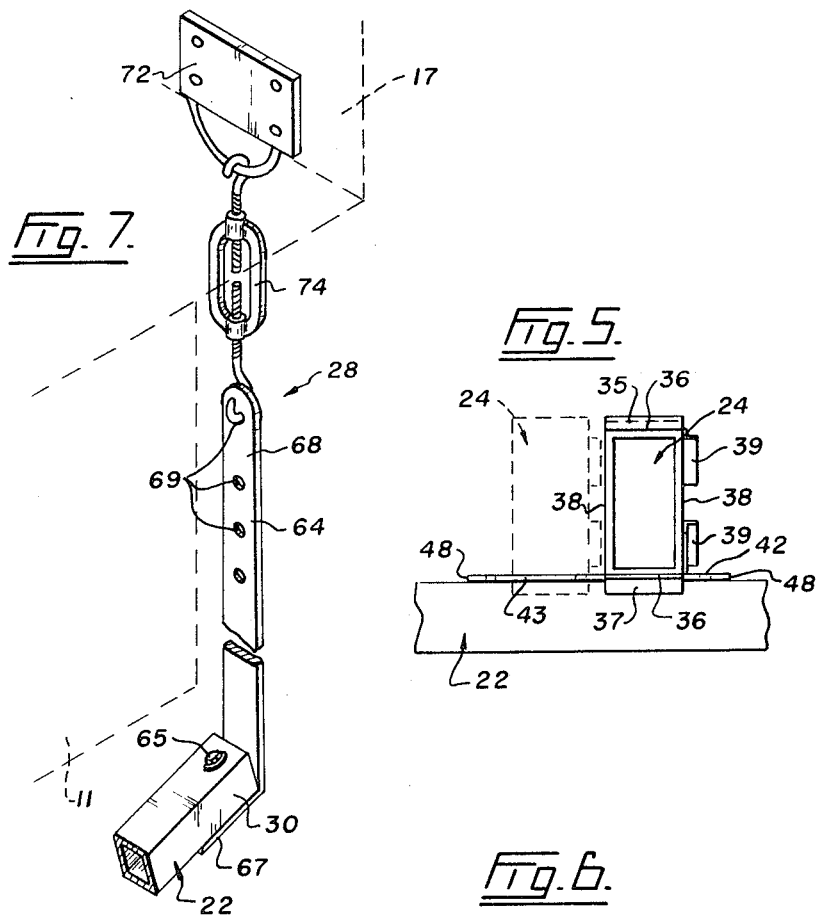

LOAD SECURING APPARATUS FOR PICKUP TRUCKS

My invention relates to apparatus for securing a load directly to the frame of a vehicle and particularly to means for attaching a camper to a pickup truck.

When a camper is carried on an open body of a pickup truck, the normal practice is to attach the load directly to the body and, since the body in turn usually is bolted to the chassis frame of the vehicle, those body bolts are subjected to a considerable strain particularly when the vehicle is travelling over rough roads or during high winds. Any camper has quite a high center of gravity and the springs of the truck will allow such a top heavy load to sway from side to side or pitch back and forth under certain wind and road conditions and this is undesirable since it can cause damage to the vehicle and even cause loss of control if the conditions are extreme.

The solution to this problem is to secure the camper to the frame of the vehicle but, as far as is known, trucks and camper manufacturers have never provided purchasers of their equipment with anything but the conventional tie-downs for securing the load to the body. The frame and body dimensions of the better known and most commonly purchased pickup trucks vary to some extent and this means the owner of a camper unit who wants the equipment necessary to secure the structure to the truck frame is required to have that equipment either specially made or modified to suit the specifications of his outfit and this adds to the already quite high costs of putting such a unit on the road.

I overcome the disadvantages inherent in the use of conventional tie-downs or substitute equipment by providing apparatus which secures the camper to a chassis frame of a truck so as to prevent undesirable side sway and to reinforce rather than to impose a strain on the body bolts. The apparatus extends transversely beneath the frame without reducing road clearance to any great extent and does not project far enough beyond the sides of the body or camper to increase the overall width of the loaded vehicle. The design of the apparatus is standardized to reduce manufacturing costs and therefore the eventual costs to the purchaser who can readily adapt the apparatus for use on his truck-camper combination assuming he owns one of the more popular makes of pickup trucks.

In drawings which illustrate a preferred embodiment of the invention,

FIG. 1 is a side elevation of a camper-loaded pickup truck fitted with apparatus in accordance with the present invention, FIG. 2 is an enlarged section taken on the line 2—2 of FIG. 1, FIG. 3 is a perspective view showing a spacer block and associated parts of the apparatus, FIG. 4 is a fragmentary horizontal section taken on the line 4—4 of FIG. 3 and showing a spacer block and base plate therefor as well as clamping means of the apparatus, FIG. 5 is a rear elevation showing a spacer block on a base plate in an alternative position of use, FIG. 6 is a plan similar to FIG. 4 with the spacer block arranged in still another alternative position of use, and FIG. 7 is a perspective view of adjustable strapping means of the present apparatus.

Referring first to FIG. 1 of the drawings, the numeral 10 indicates generally a truck of the type commonly referred to as a pickup since it has a boxlike body 11 formed independently of a cab 12 and intended to carry a relatively light load. The truck 10 has a chassis frame 14 including longitudinal members 15 and the body 11 normally is bolted or otherwise secured to this frame. When a camper 17, for example, is carried by the truck 10 it is customary to attach such a unit directly to the body 11 by suitable tie-downs or the like which are not shown. Thus, the fasteners which secure the body 11 to the frame 14 are relied upon to take the strain of the extra load provided by the often top heavy camper 17.

In order to properly secure the camper 17 and prevent excessive side sway while travelling, I propose to fit such a vehicle with an apparatus generally indicated at 20, which apparatus forms the basis of the present invention. Preferably, two of the devices 20 are used although some vehicles are constructed and loaded in the manner which will allow only one to be installed in the position near the front of the body 11. FIG. 2 shows the load securing apparatus 20 as comprising a crossbar 22, spacer blocks 24, clamping means 26, and adjustable strapping means 28.

The bar 22 preferably is formed of a box channel (FIG. 3) for maximum strength and rigidity and the bar is mounted below the members 15 to extend transversely of a chassis frame so that the upwardly inclined outer ends 30 of said bar project a short distance beyond the sides of the body 11.

Referring now particularly to FIG. 3, each spacer block 24 is shown to comprise an oblong structure which preferably is a sturdy box channel to reduce weight although a solid block may be used. Preferably, the spacer block 24 is 6 inches long, 4 inches wide, and 2 inches thick. These dimensions need not be exact but I have found that they allow the apparatus to be installed on trucks which provide varying clearance to accommodate the crossbar 22 beneath the frame members 15.

For example, the apparatus 20 is particularly intended to be sold for installation on one-half or three-fourths ton pickup trucks which are manufactured by Ford, Chevrolet, International, Dodge or Fargo. These North American made trucks are the ones most commonly used to carry campers and the clearance provided beneath their chassis frames to install the crossbar 22 and still provide the desired amount of road clearance for said bar will vary somewhat although each vehicle falls into one of three main categories which dictates a low, intermediate or high position for the crossbar. As will be explained later, the oblong shape of the spacer blocks 24 provides three alternative positions of use whereby the spacing between the crossbar and the frame members can be varied selectively.

The same trucks have slightly different centre to centre spacing between their longitudinal frame members 15 but this dimension is 34¼ inches for Ford, Chevrolet and International trucks and 38 inches for Dodge and Fargo trucks. The apparatus 20 can be adjusted to accommodate these two spacings and how this is done will be explained later as well.

Lower edge 34 of the block is fitted with a pair of positioning flanges 35 which project downwardly parallel to side edges 36 of the block. One of the side edges 36 is fitted with a pair of positioning flanges 37, these flanges being disposed parallel to the end edges 34. One of the side faces 38 of the block is fitted with a pair of positioning flanges 39, these flanges being parallel to one another and disposed at an acute angle to the end edges 34 of the block.

Each of the clamping means generally indicated at 26 includes a base plate 42 which is welded or otherwise secured to the top surface of the crossbar 22 to provide a bearer for a spacer block 24. The base plate 42 has parallel side edges 43 which overhang the adjacent side faces of the crossbar and, near the side edges, the plate is provided with pairs of holes 45 and 46. The holes 45 are arranged so that one is disposed near end edge 48 of the plate and the other hole is diagonally opposite near the center of the plate. Similarly, the pair of holes 46 are located one near end edge 49 of the base plate and the other near the center of the plate but on the side thereof opposite the central hole 45.

In addition to the base plate 42, each clamping means 26 includes a pair of clamping bolts 54 which extend through a selected pairs of holes 45 or 46 with the bolts being disposed on opposite sides of the adjacent frame member 15. The lower ends of the bolts are fitted with nuts and lock washers 55. A top connecting bar 56 extends diagonally across the top of the frame member 15 and the upper ends of the bolts project through holes 58 in this top connecting bar with the bolt end being fitted with nuts and lock washers 59. This arrangement allows the crossbar 22 to be clamped securely to the longitudinal member 15 of the chassis frame with the spacer blocks 24 gripped therebetween.

Assuming the truck on which the apparatus 20 is installed requires that the crossbar 22 be located in the low position, or at a maximum spacing from the frame members 15, then the spacer blocks 24 are placed upright on the base plates 42 as shown in FIGS. 2, 3 and 4. The positioning flanges 35 extend over the parallel side edges 43 of the base plates 42 to prevent rotation of the blocks 24 about their then vertically disposed longitudinal axes. Upper edges 34 of the blocks bear against the undersides of the frame members 15 and, when the bolts 54 are tightened down, the several parts are securely clamped together with the outer ends 30 of the crossbar disposed close to the lower edges of the sides of the truck body 11 as is desirable.

The blocks 24 may be placed with their flanged side edges 36 in contact with the base plate 42 as shown in FIG. 5 if the crossbar 22 must be located in the intermediate position previously referred to. Flanges 37 extend over and grip the side edges 43 at this time to prevent rotation of the blocks 42.

If the clearance beneath the frame members 15 allows the crossbar to be installed in the high position, or at a minimum spacing relative to said frame members, the blocks 24 are placed flat as shown in FIG. 6 or with their flanged side faces 38 in contact with the plates 42. The blocks 24 in this instance are disposed with their longitudinal axes at an acute angle to the corresponding axes of the plates 42 in order to leave the appropriate pair of holes 45 or 46 clear to receive the clamping bolts 54. The diagonally disposed flanges 39 then engage and cooperate with the edges 43 of the base plates to provide positioning means preventing rotation of the blocks about vertical axes and relative to the crossbar 24 in the same manner as the flanges 35 and 37 in the other two previously described positions of the spacer blocks.

The clamping means 26 allows the spacer blocks 24 to be spaced apart according to the spacing between the frame members 15 of the particular truck on which the apparatus 20 is installed. As shown by solid lines in FIG. 4, the blocks 24 are spaced apart a maximum distance as required on Dodge and Fargo trucks. The clamping bolts 54 then extend through the pairs of holes 46 in the base plates. The blocks 24 can be moved to the dotted line position for Ford, Chevrolet and International trucks at which time the bolts 54 would be received in the holes 45. FIGS. 5 and 6 show, in solid and dotted lines, the alternative positions of the spacer blocks 24 when placed on their side edges or laid flat. Thus, the apparatus 20 can be adjusted as required to suit the width of the frame 11 and can be secured in one of the two selected positions by the clamping means 26.

As shown best in FIG. 7, each of the strapping means 28 comprises a metal strap 64 which is secured to an outer end 30 of the crossbar by means of a nut and bolt 65. For this purpose, lower end 67 of the strap 64 is bent substantially at right angles to extend beneath the crossbar and to receive the bolt 65 whereby the strap is held against rotation about its longitudinal axis. Upper end 68 of the strap is provided with a number of longitudinally spaced holes 69. An attaching plate 72 is secured to a side of the camper 17 and a turnbuckle 74 connects this plate to a selected one of the holes 69 in the strap. If desired, any surplus material of the strap 64 which projects above the hole 69 being used by the turnbuckle, may be cut off to complete the installation. Thus an adjustable strapping means 28, one on each side of the truck body 11, ties the camper 17 to the crossbar 22 with the crossbar in turn being securely clamped to the frame 14. The body 11, in effect, is clamped between the camper and the truck chassis by the apparatus 20 and therefore the body bolts are not subjected to stress incidental to the camper swaying or bouncing while the vehicle is underway.

From the foregoing, it will be apparent I have provided apparatus which can be made in one size to reduce the manufacturing and purchasing price and which can be quickly and easily installed on most pickup trucks intended to carry campers. The apparatus secures the load directly to the frame as is desirable and does so in a way which does not appreciably reduce road or side clearance of the camper truck.

I claim:

1. Apparatus for securing a camper to a truck having longitudinal frame members supporting a camper-carrying body comprising a crossbar below the frame members, a spacer block interposed between each frame member and the crossbar, clamping means securing the crossbar to the frame members, said crossbar having outer ends disposed below and in the vicinity of opposite sides of the truck body, an upstanding strap secured at a lower end thereof to each outer end of the crossbar, adjustable securing means attaching an upper end of each strap to the camper, said spacer blocks being shaped to provide a plurality of alternative positions of use whereby the spacing between the crossbar and the frame members can be varied selectively.

2. Apparatus as claimed in claim 1, and including positioning means associated with each spacer block to prevent rotation of said block about a vertical axis and relative to the crossbar.

3. Apparatus as claimed in claim 1, and including a base plate secured to the crossbar beneath each spacer block and having parallel side edges, and opposed pairs of positioning flanges on the spacer blocks engaging the parallel side edges to prevent rotation of the spacer blocks about vertical axes in each alternative position of use.

4. Apparatus as claimed in claim 3, in which each of said base plates has a plurality of pairs of holes near the parallel side edges thereof with each pair of holes being spaced apart a predetermined distance, each of said clamping means including a pair of bolts adapted to extend through a selected pair of holes according to the spacing between the frame members of the truck.

5. Apparatus for securing a camper to a truck having longitudinal frame members supporting a campercarrying body comprising a crossbar below the frame members, a base plate secured to the crossbar beneath each spacer block and having parallel side edges, a spacer block between each frame member and an adjacent base plate, said spacer blocks being shaped to provide a plurality of alternative positions of use whereby the spacing between the crossbar and the frame members can be varied selectively, opposed pairs of positioning flanges on sides of each spacer block adapting to engage the parallel side edges of the base plates to prevent rotation of said spacer blocks about vertical axes in each alternative position of use, said base plates having a plurality of pairs of holes near the parallel side edges thereof with each pair of holes being spaced apart a predetermined distance, clamping means securing the crossbar to the frame members and including a pair of bolts adapted to extend through a selected pair of holes according to the spacing between the frame members, said crossbar having outer ends disposed below and in the vicinity of opposite sides of the truck body, an upstanding strap secured at a lower end thereof to each outer end of the crossbar, an adjustable securing means attaching an upper end of each strap to the camper.

* * * * *